United States Patent
Simke et al.

(10) Patent No.: US 6,857,743 B2
(45) Date of Patent: Feb. 22, 2005

(54) METHOD OF MANUFACTURING A SPECTACLE LENS

(75) Inventors: Andreas Simke, Kirchberg (DE); Dieter Rohr, Regen (DE); Lutz Küpper, Bischofsmais (DE)

(73) Assignee: Rodenstock GmbH (DE)

( * ) Notice: Subject to any disclaimer, the term of this patent is extended or adjusted under 35 U.S.C. 154(b) by 326 days.

(21) Appl. No.: 10/105,528

(22) Filed: Mar. 25, 2002

(65) Prior Publication Data

US 2003/0022610 A1 Jan. 30, 2003

Related U.S. Application Data

(63) Continuation of application No. PCT/DE01/02767, filed on Jul. 25, 2001.

(30) Foreign Application Priority Data

Jul. 25, 2000 (DE) .......................................... 100 36 158

(51) Int. Cl.[7] ............................ G02C 7/02; B23K 26/00
(52) U.S. Cl. ..................................... 351/177; 219/121.6
(58) Field of Search ........................ 219/121.6; 351/177

(56) References Cited

U.S. PATENT DOCUMENTS 3,672,858 A    6/1972   Berg ............................. 65/43

FOREIGN PATENT DOCUMENTS

| DE | 1 244 346 | 7/1967 |
|----|-----------|--------|
| DE | 40 03 002 | 2/1990 |
| EP | 0 062 484 | 10/1982 |
| GB | 1 208 943 | 10/1970 |
| JP | 58 020 743 | 2/1983 |
| JP | 61 219 726 | 9/1986 |

*Primary Examiner*—Scott J. Sugarman
(74) *Attorney, Agent, or Firm*—St. Onge Steward Johnston & Reens LLC

(57) ABSTRACT

What is described here is a method of manufacturing a spectacle lens in which the critical thickness is to be minimized in particular, comprising the following steps of operation:

- initially, a spectacle lens finished on one side (blank) is manufactured with a predetermined outsides contour and a round outside contour in particular,
- one part is cut out from the blank, whose outside contour corresponds approximately to the contour of the spectacle lens,
- the cut-out part is joined with the edge part with an axial offset in such a way that the edge part serves as handle for the subsequent machining operations.

17 Claims, 2 Drawing Sheets

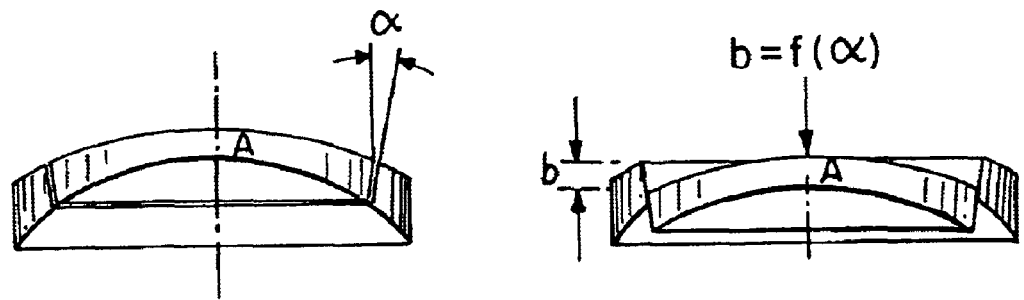
Fig. 2a
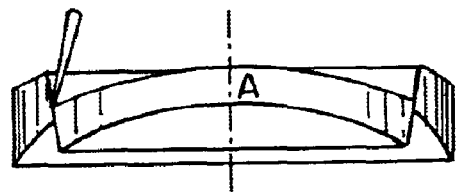
Fig. 2b
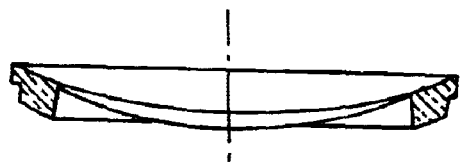

METHOD OF MANUFACTURING A SPECTACLE LENS

This application is a continuation of pending International Patent Application PCT/DE01/02767 filed Jul. 25, 2001, which designates the United States and claims priority of German Patent Application 100 36 158.7 filed Jul. 25, 2000.

FIELD OF THE INVENTION

The present invention relates to a method of manufacturing a spectacle lens.

PRIOR ART

In an approach to obtain a lens glass as light-weight as possible, the manufacturers of spectacle lenses spend any effort to produce the lenses in such a way that the critical thickness—the edge thickness on glasses producing a negative or diverging effect or the centre thickness on glasses producing a positive or converging effect—is as small as possible. For example, in the case of lenses with a converging effect, it is intended that the peripheral edge, which is required for a particular spectacle mount determined by the customer, should practically be "marginally sharp".

To achieve this objective, edge machining manufacturing operations and manufacturing steps for surface machining are combined with each other in prior art.

In order to avoid that the spectacle lens must be taken up several times, each time in a manner appropriate for the respective edge or surface machining operation, the German Patent DE 40 03 002 A1 proposes a particular block that is placed onto the finished surface of the blank—as a rule, the convex surface—and that permits both surface machining of the second surface—which is concave, as a rule—and edge machining without repeatedly taking up the spectacle lens. As far as all other particulars are concerned which are not explained here in more details, reference is made to that laid-open patent document.

What is a disadvantage in all known methods and devices in which the two surfaces are not machined initially and only after the surface machining the edge is machined, is the aspect that the spectacle lens is no longer round when hardening and particularly coating operations are carried out in a vacuum evaporation installation. It is hence necessary to insert special masks, together with the spectacle lens, into the vacuum evaporation cupola so as to avoid that as a result of the created free spaces, other spectacle lenses will be coated in the vacuum at undesirable locations.

In other manufacturing steps, too, it is not agreeable to be bound to machine a spectacle lens previously edged already in correspondence with the selected spectacle mount, rather than a "round blank" spectacle lens,

BRIEF DESCRIPTION OF THE INVENTION

The present invention is based on the problem of providing a method of manufacturing a spectacle lens, wherein, in particular, the critical thickness is to be minimized and wherein, despite the consideration of the subsequent outside contour, a "non-round" spectacle lens need not be machined during the machining operation.

One inventive solution to this problem is defined with the method steps set forth in Patent Claim 1. Improvements of the Invention are the subject matters of the Claims 2 et seq.

The inventive method is based on the general idea of employing a cutting operation instead of the cutting operation used for edge production in prior art—as a rule: a grinding operation—which serves to machine the edge of the spectacle lens to achieve the subsequent shape, so that the edge part is retained as annular element that may be used as handle for the further manufacturing process.

In the inventive method initially a spectacle lens finished on one side (which will also be referred to as blank in the following) is produced in a manner known per se, which has a predetermined outside contour and a round outside contour in particular. It is also possible, of course, to select a particular other outside contour such as an elliptic outside contour instead of a round outside contour.

As a rule, the finished surface of the blank is the convex front surface; it is also possible, of course, to select the surface on the eye side as finished surface—which is concave, as a rule.

One part is cut out of the blank, which has an outsides contour that corresponds approximately to the shape of the spectacle lens inserted into the respective mount. In view of the subsequent operating steps, the outside contour of the cut-out part is normally not precisely equal to the outside contour of the future spectacle lens; the outside contour is rather slightly wider, The cut-out part is joined with the edge part, which has, as a rule, the shape of a ring, in such a way that the edge part serves as handle for the ongoing machining process, The edge part may be used for the production of the second surface.

For cutting out the central part, which constitutes the future spectacle lens, a laser may be employed in particular.

The cutting operation proper may be carried out in such a way that the cutting surfaces of the part used for the spectacle lens and of the edge part present the shape of a cylinder; it is particularly preferred, however, that the cutting surfaces have the shape of a cone or of a cone with a cone angle $\alpha$.

In the first case, the central part "drops out" from the edge part after completion of the cutting operation so that the central part must be connected to the edge part, for example via a clamping ring or a collar. In order to allow such a connection it is preferred that the edge part is provided with a gap by the first cut: as a result, it is possible to squeeze the edge part in such a way that the central part will be held in the edge part.

In the second—preferred—possibility, the central part, which constitutes the spectacle lens, is lowered relative to the edge part in such a way that it adheres against the conical inner surface of the edge part. It is particularly preferred that the part is fixed on the edge part. For fixation it is possible to operate with laser welding and/or adhesive bonding.

The edge part serves as handle for the subsequent operations—which is round, as a rule. It is therefore possible to use the edge part as mask, for example in hardening.

It is particularly preferred, however, that the edge part is used as handle for the further operating steps, with the edge part possibly serving for the production of the second surface. It is possible here that during the operation on the second surface the edge part, too, is machined and particularly cut and polished.

Moreover, the edge part may serve as assistant in blocking the spectacle lens for specific machining operations.

Moreover, the edge part may serve as information carrier—e.g. by application of a bar code, an order number, etc. for the further machining and for delivery of the spectacle lens.

Furthermore, the edge part permits a fully automatic measurement without visual orientation.

BRIEF DESCRIPTION OF THE DRAWING

In the following, the invention will be described by embodiments in more details, without any limitation of the general inventive idea, with reference to the drawing wherein:

FIGS. 2a and 2b illustrate a second embodiment of the invention.

DESCRIPTION OF EMBODIMENTS

Figure 1A:
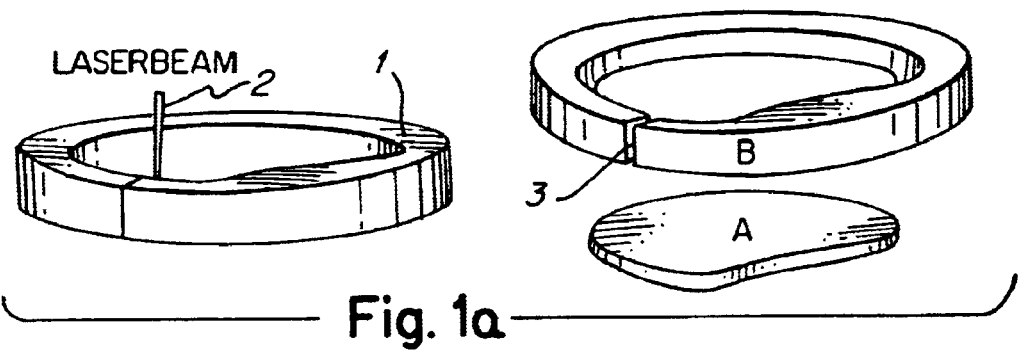
FIGS. 1a and 1b show a first embodiment of the invention.

FIG. 1a illustrates a first embodiment of the invention. By means of a laser beam 2, a part A is cut out from a molded round blank 1, whose outside contour corresponds approximately to the shape of the future spectacle lens. The cutting areas of the part A and of the remaining edge portion B have a cylindrical shape so that the part A may drop out of the edge part B.

Figure 1B:
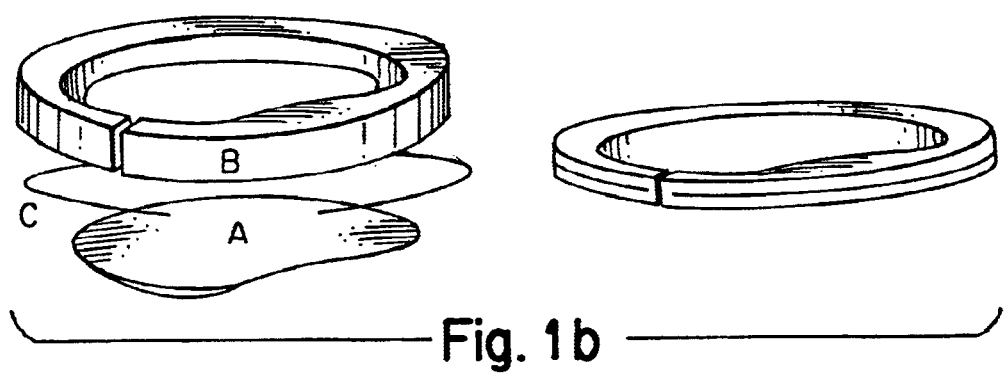

In order to be able to fasten the part A in the edge part B whenever this is necessary the cutting operation is so performed that during the initial cut a gap 3 is created in the edge part B. On account of the gap 3 it is possible to fasten the part A in the edge part B by the provision that the edge part is compressed by means of a clamping ring C. This is illustrated in FIG. 1b. The right part of the illustration in FIG. 1b shows the edge part B into which the part A is inserted and held there by means of a clamping ring C.

FIG. 2a shows a second embodiment of the invention wherein the same parts are identified by the same reference numerals so that a repeated discussion is dispensed with.

In distinction from the embodiment illustrated in FIG. 1, the cutting operation is carried out in the case of the second embodiment according to FIG. 2 in such a way that the resulting cutting surfaces are not cylindrical but rather present a conical shape. As a consequence, the part A adheres against the part B after it has been lowered by a distance b, which constitutes a function of the cone angle. In the lowered condition, the part A may be fixed in the edge part B, e.g. by laser welding (cf, lower part in FIG. 2a).

The parts A and B can then be machined in the conventional manner, e.g. by a cutting, polishing and hardening operation. FIG. 2b illustrates the parts A and B after the machining operation.

The inventive method presents a number of advantages:

For example, in the case of centre thickness minimization in the case of high numbers of units, an appropriate seal between the edge part B and the part A during hardening furnishes a cost reduction. Moreover, the number of the required accommodation rings is reduced.

Lenses with thin edges are stabilized by the edge part B and protected from thermal distortion; the thin edge is reinforced relative to and simultaneously protected from machining forces. Moreover, the edge part B constitutes also a protection from injury in handling.

In the inventive method, it is possible to apply any known polishing technique. Moreover, non-round lenses are fully supported in solids blocking. Moreover, an improvement of quality is achieved by the provision that for cleaning or hardening retaining brackets are applied on the edge part and not on the spectacle lens proper.

Moreover, with the displacement ring/inner part in terms of height the advantage is achieved that material is available again for the complete ring in the area of the over-edge sharpness. The term "over-edge sharpness" means that in the case of a converging or positive lens having a convex shape, this lens becomes "sharp at the edge by some time" as the diameter increases. When the diameter undergoes a further increase material is no longer available.

Moreover, the edge part B may be used as information carrier.

Above all, however, it is possible to centre the outside edge. To this end, it is possible, for example, to apply a bar marker on the production edge during the engraving operation in the blocked condition so that fully automatic edge removal without visual orientation is possible after hardening.

In the last analysis, the lens can be measured without visual orientation in a fully automated operation.

What is claimed is:

1. Method of manufacturing a spectacle lens, wherein the critical thickness is to be minimized in particular, comprising the following steps of operation:

initially, a spectacle lens finished on one side (blank) is manufactured with a predetermined outside contour and a round outside contour in particular, a cut-out part is cut from the blank, forming an outside contour of the cut-out part that corresponds approximately to the contour of the spectacle lens, the cut-out part is joined with an edge part with an axial offset in such a way that the edge part serves as a handle for subsequent machining operations.

2. Method according to claim 1, characterized in that the edge part serves for the manufacture of a second surface.

3. Method according to claim 1, characterized in that a laser is used to cut the cut-out part.

4. Method according to claim 3, characterized in that the edge part has the shape of a ring.

5. Method according to claim 4, characterized in that the cut-out operation is carried out in such a way that the cutting surfaces of the cut-out part and of the edge part have the shape of a cylinder.

6. Method according to claim 5, characterized in that the edge part is provided with a gap by the initial cutting operation.

7. Method according to claim 6, characterized in that the cut-out part and the edge part are connected to each other by means of a clamping ring or a collar.

8. Method according to claim 1, characterized in that the cut-out operation is carried out in such a way that the cutting surfaces of the cut-out part and of the edge part present the shape of a cone.

9. Method according to claim 8, characterized in that after the cut-out part is lowered, relative to the edge part, in such a way that it adheres against the conical inner surface of the edge part.

10. Method according to claim 9, characterized in that the cut-out part is fixed on the edge part.

11. Method according to claim 10, characterized in that fixing is carried out by laser welding or adhesive bonding.

12. Method according to claim 11, characterized in that a blank finished on the convex side is used as blank.

13. Method according to claim 12, characterized in that during the machining operation on the second surface, the edge part, too, is machined and particularly cut and polished.

14. Method according to claim 13, characterized in that the edge part serves as assistant in spectacle lens blocking.

15. Method according to claim 14, characterized in that the spectacle lens is hardened together with the edge part, and is coated in particular in a coating installation.

16. Method according to claim 15, characterized in that the edge part serves as information carrier for the further machining operations.

17. Method according to claim 10, characterized in that fixing is carried out by laser welding and adhesive bonding.

* * * * *